Dec. 19, 1967  Q. R. THOMSON  3,358,577
AIR DIFFUSING REGISTER
Filed Aug. 16, 1965  4 Sheets-Sheet 1

INVENTOR.
QUENTIN R. THOMSON
BY
ATTORNEYS

Dec. 19, 1967  Q. R. THOMSON  3,358,577
AIR DIFFUSING REGISTER
Filed Aug. 16, 1965  4 Sheets-Sheet 4
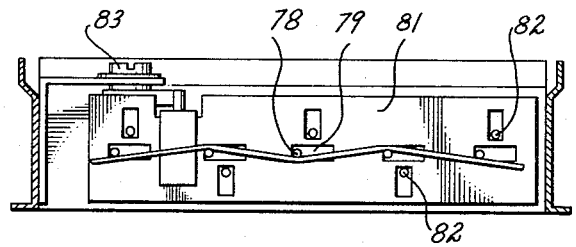
fig. 8
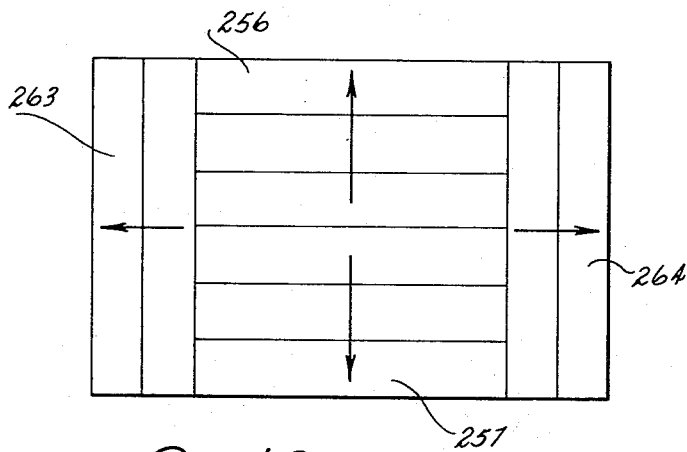
fig. 12
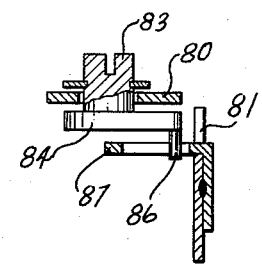
fig. 9
fig. 11
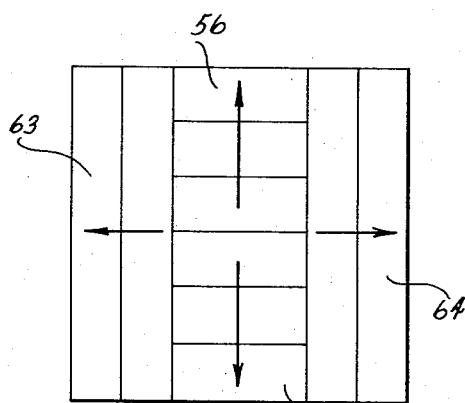
fig. 10
INVENTOR.
QUENTIN R. THOMSON
BY
ATTORNEYS

United States Patent Office 3,358,577
Patented Dec. 19, 1967

3,358,577
AIR DIFFUSING REGISTER
Quentin R. Thomson, Tucson, Ariz., assignor to
Krueger Manufacturing Company
Filed Aug. 16, 1965, Ser. No. 479,937
4 Claims. (Cl. 98—40)

ABSTRACT OF THE DISCLOSURE

An air diffusing register utilizing a perforated faceplate and having air deflector vanes supported in close proximity to the faceplate to facilitate diffusion of the air passing therethrough. An air damping unit is mounted within the diffusing register.

---

The present invention relates to an air diffusing register, and particularly an air diffusing register which may be used to control and/or distribute either hot and/or cold air in room space as part of an air conditioning system in which both heating and cooling air are supplied.

The delivery of air to various parts of a building such as an ordinary home when central heating was first introduced was a relatively simple matter, usually involving merely the utilization of a "register" at strategic locations to regulate the amount of heated air introduced into the room, and a suitably placed return duct. Air conditioning, when introduced as a separate system, involved more sophisticated engineering of air temperature, air movement and air moisture, but the basic system when air conditioning alone is involved is relatively simple as contrasted with modern systems in which heating and cooling are provided in a single duct system with at least one air diffusing register in each room and the movement of either warm air or cool air through the same duct system.

Normally, warm air will rise and cool air will drop, and these characteristics must be taken into consideration. Furthermore, heated air tends to warm objects in the room so that radiation from the warmed objects will contribute to comfort, while this characteristic, generally speaking, is not true where a home is being cooled. As a general rule, outside walls will be warmer than any of the objects in a room and there is a tendency for radiation to occur from an exterior wall, window, or the like, to a room occupant, thus tending to contribute to discomfort. It is essential, therefore, that air passing through duct work be capable of being directed with minimum turbulence substantial distances across a room from a point of ingress, and that such air distribution be capable of modification under many conditions encountered by an air conditioning contractor.

Important to proper air conditioning is the distribution of the air in proper amounts to the various portions of a building such as the ordinary home. Normally, air delivered from a heating or cooling source enters a plenum chamber and duct work leading from the plenum chamber carries the air to the various rooms into which it is to be distributed. From an economic standpoint, it is usually desirable that the duct work be uniform in cross section so that a situation exists where the friction to the passage of air to various ducts will be different, and of course normally a larger room will require the delivery of more air than a smaller room. It has been a common practice to employ opposed blade dampers at the outlet of each duct, and it is not uncommon, also, to utilize two sets of air directing vanes, one set movable on an axis running transversely of the room and the other set rotatable on an axis running vertically of the room. This arrangement, while satisfactory in many respects, creates considerable air turbulence and also has its unsightly aspects. Recently it has become a common practice to employ a diffuser plate utilizing a relatively large number of small openings so arranged that the operating mechanism behind the plate is concealed, and the plate may be finished in any suitable color according to the decor of the room, theoretically without appreciable loss in the ability to direct and diffuse the air properly. Devices employing a diffuser plate of the type identified have not been fully satisfactory from an efficiency standpoint, although they have contributed to the appearance of air conditioning installations.

The principal object of the present invention is the provision of an improved air diffusing register.

Another object is the provision of a register in which a column of air may be directed through a diffuser plate with a minimum of turbulence.

Still another object is the provision of an air diffusing register in which a column of air may be moved with a minimum amount of turbulence and over a long distance with a greater velocity than has been possible with comparable devices of the prior art.

A still further object of the invention is the provision of a specially designed air diffusing register which may be adjusted and/or modified to suit any condition encountered in the ordinary air conditioning system.

Other specific objects and features of the invention will be apparent from the following detailed description taken with the accompanying drawings wherein:

FIG. 3 is an exploded view showing the several subassemblies which may be utilized with the embodiment of the invention shown in FIGS. 1 and 2;

FIG. 8 is a transverse sectional view taken along the line 8—8 of FIG. 7, and showing the opposed blade damper adjusting plate in elevation;

FIG. 9 is a fragmentary sectional view showing structural features of the opposed damper blade adjusting mechanism;

FIG. 10 is a schematic view in plan showing the arrangement of the air directing vanes utilizing in the embodiment of the invention shown in the drawings; and FIGS. 11 and 12 are views similar to FIG. 10 but showing two of several other possible arrangements which may be employed.

Figure 2:
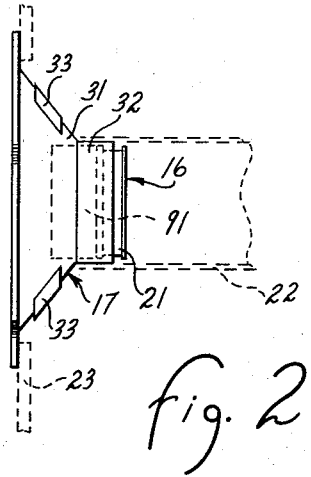
FIG. 2 is a side elevational view thereof.

The air diffusing register of my present invention, indicated generally by the reference character 16, comprises a casing or frame, indicated generally by the reference character 17 (note FIG. 3), a diffuser plate or perforated face plate indicated generally by the reference character 18, an air direction controlling assembly indicated generally by the reference character 19, and an air volume controlling assembly indicated generally by the reference character 21 which, in some installations embodying the invention, may be deleted. The entire register assembly is adapted to be conventionally placed at the end of an air delivering duct 22, shown in broken lines in FIG. 2, and the frame 17 is adapted to set into a suitable opening in a room wall, indicated in FIG. 2 by the reference character 23.

The casing 17 includes a suitably formed peripheral frame portion 24 shown square in the embodiment illustrated in the drawings. The peripheral frame portion 24 may comprise a stamping produced from any suitable sheet material such as mild steel, and in its fabrication it is suitably shaped to produce the necessary strength and rigidity and simultaneously is provided with a plurality of openings 26 just inside of its outer margin, these openings being formed primarily in a partly recessed area 27 so dimensioned that the diffuser plate 18 and the top outer edge of the peripheral frame portion 24 will be substantially flush with each other. The openings 26 extend slightly upwardly into an edge portion of the frame portion 24 so that edge springs 28 on the face plate 18 may be snapped into position within the frame portion 24 at the openings 26, and oppositely positioned ears 29 on the air diffusing face plate are at the same time lodged in opposite openings 26.

The remaining portion of the casing 17 comprises four separate pieces of stamped metal, each comprising a diagonal portion 31 and a portion 32 aligned with the duct 22 and adapted to form a suitable attachment with the duct in any conventional manner. The four separate pieces of stamped metal are secured to the peripheral frame portion 24, as by spot welding, and reinforcing strips 33 may be used exteriorly of the corners to impart added strength, as shown particularly at FIG. 2.

One of the advantages of the structure of the casing 17 as described is not only the economy of its production but the fact that the four separate pieces secured to the peripheral frame portion 24 may have various shapes to permit the assembly to be utilized with different types of duct work without the necessity of providing a large amount of additional tooling to produce the entire casing.

Figure 1:
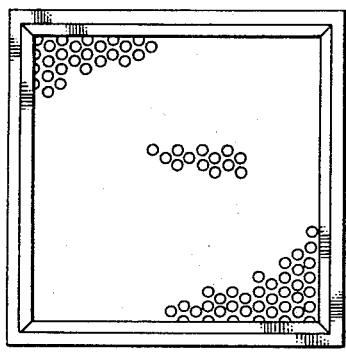
FIG. 1 is a front elevational view showing the air diffusing register of my present invention.

The diffuser plate may be made in a number of ways, but one very simple procedure is to sandwich a uniformly perforated plate 34 between edge strips 36 and 37, the assembly 18 being produced by suitably welding or partially deforming the metal itself. Suitably, the edge strips 36 and 37 may be of extruded aluminum, each with a continuous projection 38 parallel to their side edges, the projection 38 on the strip 37 acting as a side stop for the center perforated plate 34 and as a stop for the ears 29 and edge springs 28. The peripheral strips 36 and 37 are mitered at their corners, as FIGS. 1 and 3 show, to produce a true rectangular shape; in the case of the embodiment shown, a substantially square shape. A suitable method of assembling the diffuser plate is to place the strips 37 downwardly with the side edges of the central perforated plate 34 abutting the projections 38 on the strips 37, then placing the strips 36 in position and finally spot welding the assembly together with or without first applying the springs 28 and ears 29. Spot welding techniques are now available which will produce an adequately rigid assembly without marring the exposed surfaces of the strips 37. Preferably, also, the peripheral frame formed by the strips 36 is set in slightly so that the edges of the strips 37 can come into close contact with the offset peripheral edge 41 of the frame 17 which is seen from the outside, the entire face plate of the diffuser resting on the inwardly facing continuous projection 38 to assure that the exposed portions of the face plate frame and peripheral exposed frame portion 24 of the casing 17 are in the same plane.

While the perforated plate 34 may be formed of various materials and its perforations take various forms, very good results have been obtained by the use of perfectly round openings 39 which are approximately between about one quarter inch and 3/32 of an inch in diameter (figures being given before painting). It will be noted that alternate lines of perforations are staggered to obtain overlapping and produce a greater area for air passage. With this construction there will be approximately 1200 to 1800 uniformly spaced openings 39 in the plate 34 when the entire register is about 12 inches square. This arrangement allows for maximum air diffusion while still substantially completely masking the working mechanism behind the plate and permits finishing the plate in accordance with the decor of the room. As pointed out, the plate is readily removable for adjustment of the remaining portion of the air diffusing register.

As to the material from which the plate 34 is produced, any material which provides adequate strength and relatively, high vibration damping characteristics is suitable. There are high manganese alloys which have such unusual vibration damping characteristics that the metal will not go through even one cycle of vibration with the energies involved in the present construction. Such alloys, however, are relatively expensive and good results have been obtained using relatively soft aluminum sheet material of approximately 18 to 22 gauge.

The present invention is largely concerned with the air deflecting louvers as shown in assembly 19, principal characteristics of which are the use of curved air deflecting blades providing a minimum of turbulence designed to project very close to the air diffusing face plate, and the provision of the equivalent of a small plenum chamber immediately behind this assembly so that air entering the space between the curved blades will have a minimum of turbulence.

Figure 4:
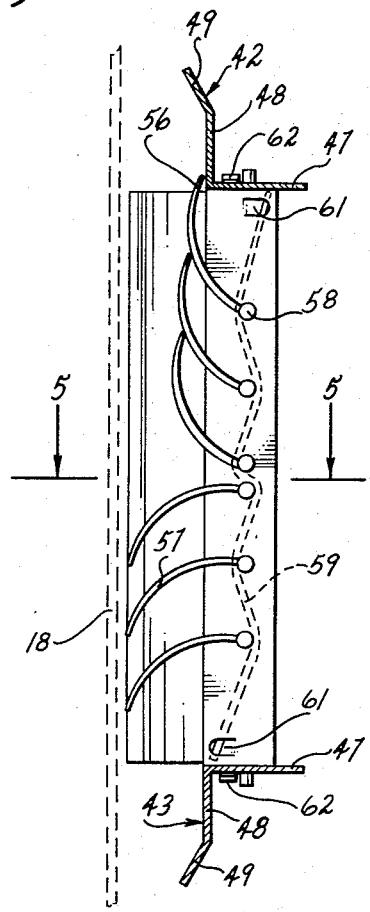
FIG. 4 is an enlarged transverse sectional view taken on the line 4—4 of FIG. 3, the position of the diffusion plate being indicated by dotted lines.
Figure 5:
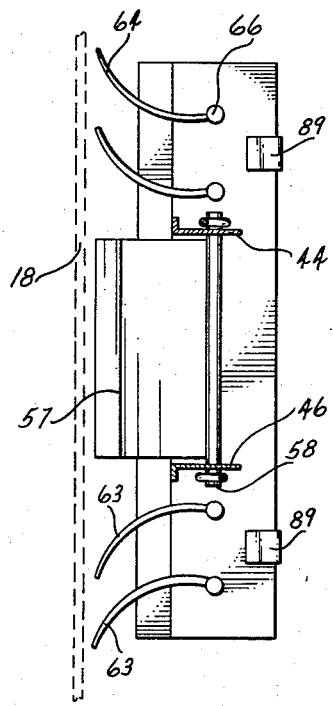
FIG. 5 is a transverse sectional view taken on the line 5—5 of FIG. 4 looking in the direction of the arrows, the diffusion plate also being dotted in in this particular figure to show its relationship to the air distributing vanes.

Referring now first to FIGS. 3, 4 and 5, the assembly 19 is provided with a frame comprising two relatively widely spaced but mutually parallel frame members 42 and 43 together with a pair of inset, relatively narrowly spaced frame members 44 and 46. The frame members 42 and 43 have a portion 47 lying in a plane substantially parallel to the plane in which the air moves, right angular portions 48 and diagonal portions 49 which engage against oppositely facing diagonal portions 31 so that the entire assembly 19 can be secured in position within the opening defined by the casing 17 by means of sheet metal screws 51 which extend through holes 52 in the diagonal portion 49 and into screw holes 53 in oppositely facing diagonal portions 31 of the casing 17. Because of this arrangement, the adjustable louvers or vanes carried by the assembly 19, in a manner to be shown, will all be effective to control the air moving from the duct 22 and the diffuser plate.

In the embodiment shown, there are six short vanes 56 and 57 formed into two sets, the set comprising the vanes 56 facing in one direction and the vanes 57 facing in an opposite direction. The vanes 56 and 57 are formed with a tubulation at one edge which frictionally engages a stub shaft 58 in each instance, the said stub shafts extending through the frame members 44 and 46 and being provided with suitable means to impart friction to the movement of the shafts which turn with the adjustable vanes or louvers 56 and 57. A suitable method is the utilization of a spring wire 59, the ends of which engage over tabs 61 struck from the material of the frame members, the center portion of the wire frictionally engaging the surface of that portion of the shafts 58 projecting beyond the frame members. The vanes 56 and 57 are held in position between frame members 44 and 46 as FIG. 5 shows, and these frame members are in turn held in assembled relation with the frame members 42 and 43 through the instrumentality of end tabs 62 extending through slots formed in the portion 47 of the frame members and bent or peened over to produce a relatively rigid assembly. In producing the assembly 19, as in producing the assembly comprising the face plate 18, suitable assembly jigs may be used to hold the parts in position until the parts are finally assembled and fastened together as desired.

On opposite sides of the frame members 44 and 46, there are two sets of relatively longer curved vanes or louvers 63 and 64, these vanes also being shaped with a tubulation on one side edge frictionally engaging around stub shafts 66 which extend through the portion 47 of the frame members 42 and 43. Similar means may be employed to apply adequate friction to the shafts 66 so that they will not be displaced by movement of air past them. The installer will normally position the curved vanes or louvers by hand and commonly they will remain in the position to which they are adjusted, but they are capable of adjustment by the occupant if necessary when an air conditioning system is operated to cool a house instead of to heat it. It will be noted, looking at schematic FIG. 10 for examples, that the vanes 57 can be adjusted to direct the air upwardly as shown by the arrow, and the remaining vanes 57, 63, and 64 adjusted to direct the air in the other three possible directions, also as indicated by the arrows. The curved vanes, as will be noted, can turned readily to a position to prevent the passage of air substantially completely through one of the segments of the diffuser.

The louvers have been referred to as curved and it should be understood that many types of curves may be utilized to change the path of the air smoothly rather than turbulently as occurs when air strikes sharply and tangentially against a slanting surface such as occurs when the vanes are flat. With curved vanes, the portion of the vane which the air initially encounters in its passageway between the vanes will generally face in the same direction as that in which the air is moving, and the air will be directed to a new path with a minimum of turbulence. By comparison, when ducts are produced, a curved elbow connecting two ducts at right angles to each other will provide much less resistance to the passage of air and greatly decrease turbulence as contrasted with an installation where two ducts are connected to form a sharp right angle and a flat face against which the supply of air moving from the plenum chamber strikes before it can turn the corner.

While the vanes or louvers utilized in the present invention may have various types of curves, it has been found that a curve comprising a substantially true arc is both satisfactory from a practical standpoint and more inexpensive to produce than a shape defining a compound curve. It has been found that the radius of curvature may be, for example, between approximately ½ inch and 2 inches, depending upon a number of factors including the width of the blades, their spacing, the total size of the unit and other factors. In a unit such as shown in which the opening in the frame member 17 is approximately 5¾ inches, for example, a size which can be utilized on most conventional home air conditioning installations, the radius of curvature of the vanes is suitably about 1 inch.

Figure 6:
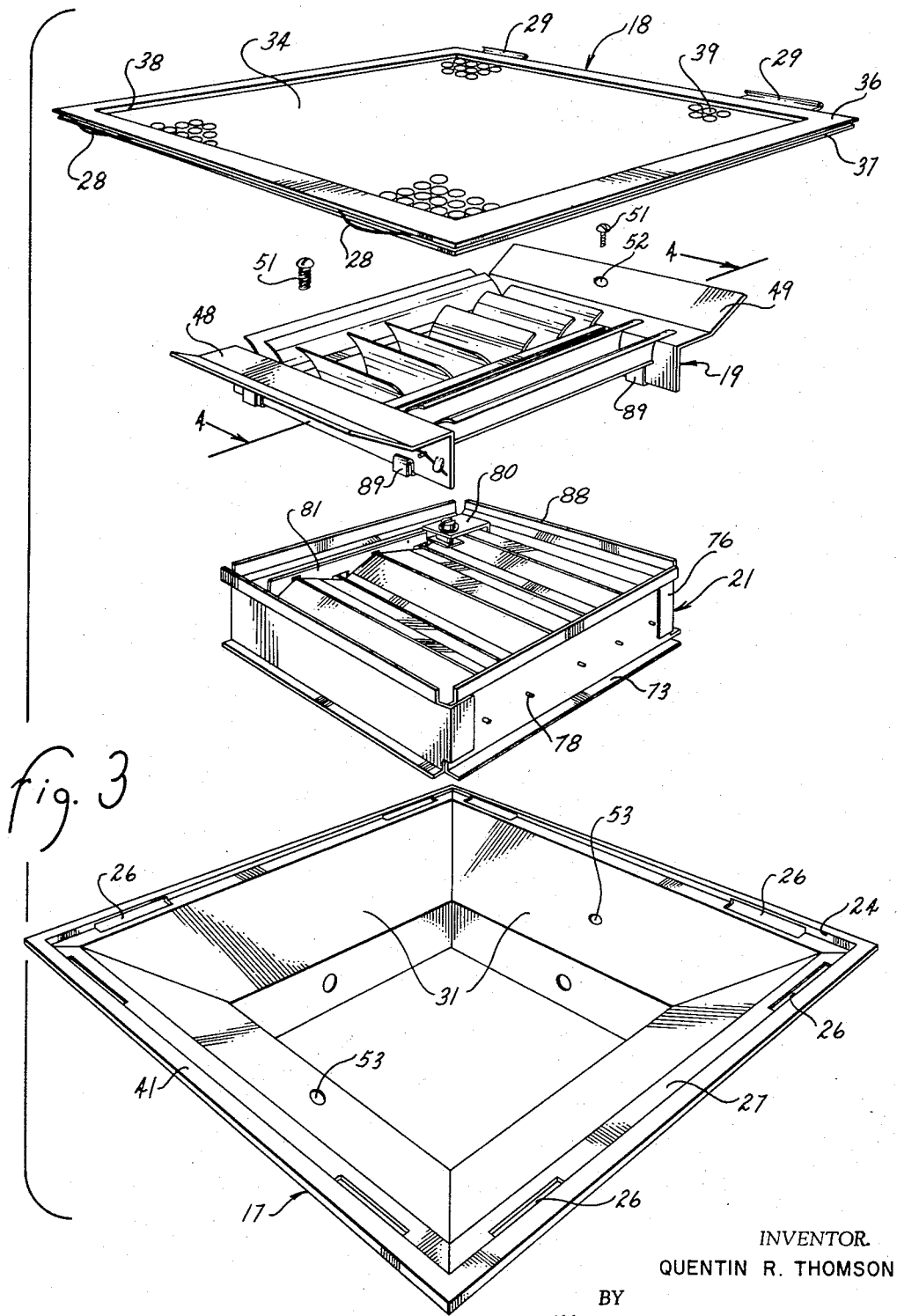
FIG. 6 is a rear elevational view of the opposed blade damper used in the present invention.

The opposed vane damper includes frame members 71 and 72 parallel to each other and spaced therefrom by oppositely facing and opposed frame members 73 and 74, the frame members being secured together to form a frame assembly of substantially square configuration. Frame members 73 and 74 have tabs 76 provided on their ends and folded over at right angles to engage the outside faces of frame members 71 and 72. By spot welding the tabs 76 to the frame members 71 and 72, an adequately rigid assembly is formed. A plurality of vanes 77 have generally central shafts 78 functionally integral with the vanes with one end projecting through the frame member 72 and pivoted therein and the opposite end projecting through slots 79 in an actuating plate 81 and projecting through frame member 71 and pivoted therein. Each of the damper vanes, moreover, has an operating shaft 82 which is pivoted in the actuating plate 81, so that when the actuating plate 81 is moved to left or right, the damper vanes are caused to rotate about the axes of their shafts 78 a direction and distance governed by the position to which the shafts 82 are pivoted by the actuating plate 81. When the pivots are arranged as shown, damper vanes 77a and 77b have their top edges, as seen in FIG. 6, moved toward each other, and this same action occurs with respect to the top edges of damper vanes 77c and 77d. Vane 77e is rotated in the same direction as vanes 77a and 77c, the result being that the vanes 77a and 77b come together at their top as do vanes 77c and 77d. Vane 77a has its left-hand edge moved over almost into contact with frame member 73 to decrease the amount of air passing through the damper at this point. The bottom edges of vanes 77b and 77c on the one hand and 77d and 77e on the other hand come together to inhibit or control air flow, with one side edge of vane 77e coming almost into contact with frame member 74. This is not an unusual action for an opposed vane damper, but the actuating mechanism may vary, and include, for example, a series of intermeshing gears. The specific manner of actuating the damper vanes may, of course, vary. The damper, however, is employed in the assembly of the present invention to secure certain advantages not heretofore fully realized.

Figure 7:
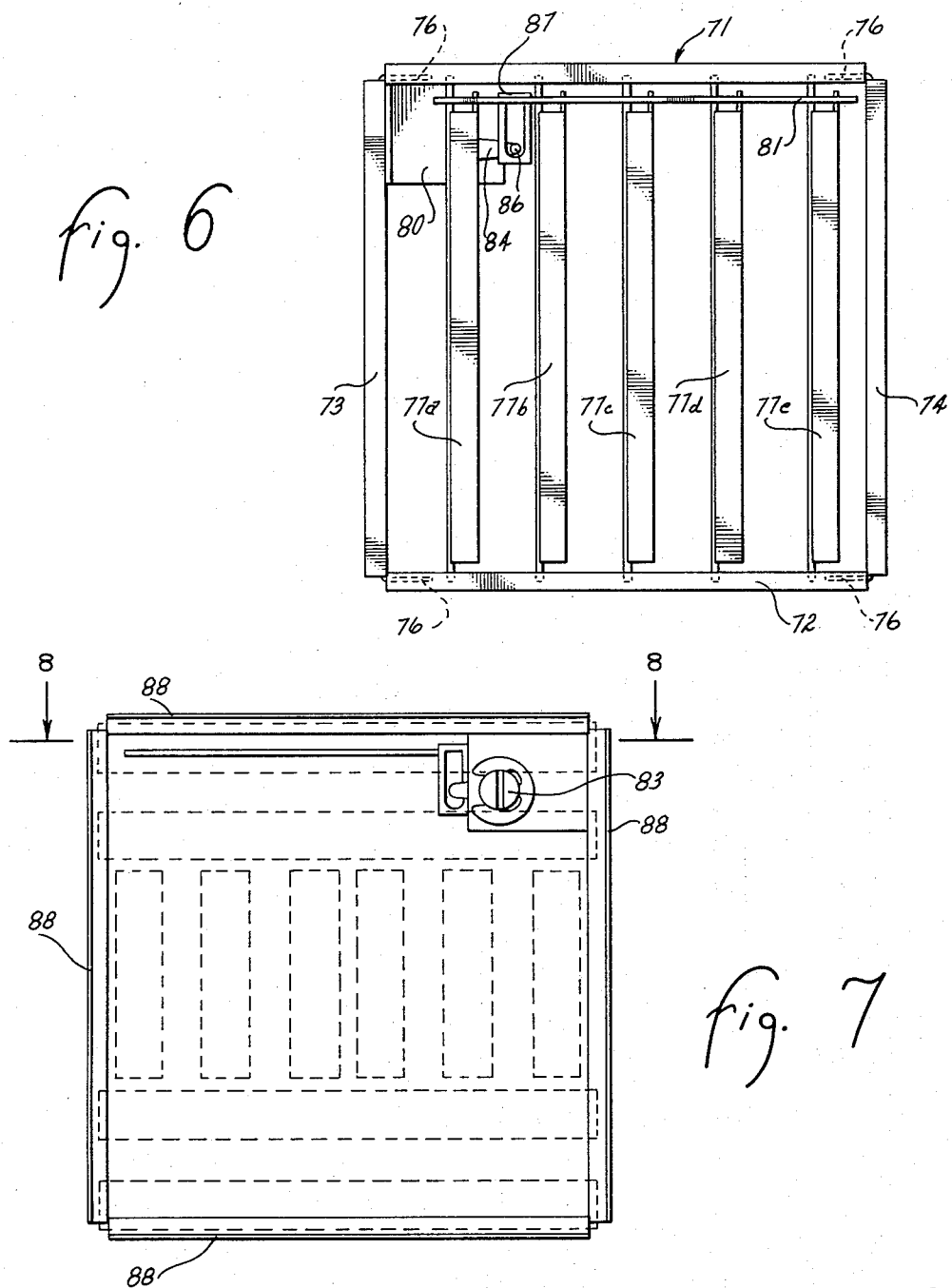
FIG. 7 is a front elevational view thereof with the blades of the air directing vanes dotted in to show the accessibility of the damper adjustment.

The actuating mechanism for adjusting the opposed vanes of the damper includes a frame plate 80 which has one right angular portion secured as by spot welding to the frame member 72 and a second right angular portion rotatably supporting the shank of an adjusting screw 83, one end of which carries a short lever 84 having a pin 86 projecting into a slot, as shown in FIG. 6, into a right angular plate member 87 carried by the actuating plate 81. Thus, when the head of screw 83 is turned with a screwdriver, the lever 84 and pin 86 will move the actuating plate 81 either to the left or right to either close or open the vanes 77. As may be noted by reference to FIG. 7, the adjusting screw 83 can be reached by inserting a screwdriver between the curved vanes of the diffuser assembly 19, it being necessary merely to remove the diffuser face plate 18 for this purpose, so that individual dampers in a completed installation may be adjusted in accordance with air requirements at any time.

Looking now further to the damper shown particularly in FIG. 6, it will be noted that the back edges of the frame plates are turned at right angles to the main body of the frame plates to provide strength. At the opposite edges of the frame members, however, there is an angular offset area providing in each instance a projection 88 on each frame member which is parallel to the plane of the frame member assembly of the damper assembly and will project outside the portions 47 of the frame members 42 and 43 of the diffuser. Tabs 89 hold these two members in assembled relation when they are brought together from the positions shown in FIG. 3, so that when the subassemblies comprising members 19 and 21 are brought into mutual engagement and into engagement with the main casing 17 and the screws 51 turned home, an overall assembly is produced in which air moving through the duct 22 first engages the opposed vane damper 21 and then comes into contact with the vanes of the diffuser assembly 19. The arrangement leaves an open area 91, indicated by the broken lines in FIG. 2, which itself acts somewhat like a plenum chamber to create an area of partial static pressure to maximize air flow and partially smooth out any turbulence which may have been imparted to the air before it enters the small plenum chamber, so that the air moving into contact with the curved vanes in the diffuser reaches these vanes with a minimum of turbulence. When the air then is delivered through the vanes, directed as required, there is a minimum of turbulence and maximum penetration of a column of air through a given area will occur. In other words, the column of air entering the room will spread and enlarge as it moves outwardly more or less in accordance with standard established diffusion patterns with minimum counteracting turbulence.

One of the characteristics of the device of the present invention which appears to be important in securing excellent practical results is the fact that when the diffuser plate 18 is in position, the curved vanes when fully extended come almost into contact with the perforated plate 34, and as these vanes are angled to change the direction of flow of the air, the distance between the outer free edges of the vanes and the perforated plate 34 is very small so that the air moves through the said plate with a minimum of impedance. Unlike flat vanes, moreover, the curved vanes may be moved to substantially completely seal off any portion of the diffuser in the manner shown particularly in FIG. 4. It should be noted, for example, that if flat blades had been used as the upper blades in FIG. 4, there would still be a substantial area in which the air would be directed through the plate 34 at a very sharp angle. Indeed, with flat blades, it is exceedingly difficult to obtain as much adjustment as with the blades used in the present invention without imparting noise-producing turbulence which can spread by vibration through the entire assembly.

In the specification, more or less conventional terminology has been used, but with no intention of limiting the scope of the disclosure or limiting the invention to the precise embodiment shown and described. Thus, the terms louvers, vanes and blades, while technically not strictly identical, have been used more or less interchangeably. It is recognized, also, that the term "register" is becoming somewhat obsolete, and the term is used here in a general sense to identify a unit placed in a suitable position to control, direct and otherwise influence the movement of either hot and/or cold air.

Reference has already been made to FIG. 10 which shows the deflector or diffuser vanes of the present embodiment as constituting substantially a square arrangement. In FIG. 11, a similar arrangement is shown in which the shorter curved vanes 156 are all deflectable in one direction as indicated by the arrow, but the blades 163 and 164 would be deflectable in the same manner as the curved vanes or louvers 63 and 64 in FIG. 10. In FIG. 12, a rectangular arrangement is shown in which vanes 256 and 257 have approximately the same size as vanes 263 and 264. Such an arrangement might be employed, for example, where greater vertical control of the total air volume is desired. By suitable modification, the arrangement of FIG. 12 might be used with the same frame and casing arrangement, but it might be preferable to use a rectangular casing in which the width was greater than the height. FIGS. 11 and 12 are shown to illustrate the fact that many modifications of the curved vane arrangement in an air diffusing register may be employed without departing from the scope of the present invention as defined by the claims.

I claim:

1. In an air diffusing register for the purpose and of the character described, the combination of
   (a) a casing having a generally rectangular peripheral portion adapted to be supported approximately flush with a room wall,
   (b) a diffusion plate releasably supported within said peripheral portion and generally coplanar therewith,
   (c) a reduced area portion of said casing adapted to be connected to a duct of an air conditioning system,
   (d) a portion of said casing connecting said peripheral portion and reduced area portion so that all air entering said reduced area portion will pass through said diffusion plate,
   (e) an opposed blade damper subassembly supported in said reduced area portion, and
   (f) an air deflector unit supported in said reduced area portion but spaced from said opposed blade damper unit to form a relatively small plenum chamber,
   (g) said air deflector unit including a plurality of mutually aligned pivoted arcuate louvers positioned within said casing to permit air to pass over both sides of each of said louvers and with unpivoted edges lying in close proximity to the said diffusion plate, said pivoted louvers each pivotally mounted on a frame secured to said casing.

2. An air diffusing register as defined in claim 1 including a plurality of sets of arcuate louvers adjustable to direct air substantially free of turbulence in more than one direction.

3. In an air diffusing register for the purpose and of the character described, the combination of
   (a) a casing having a generally rectangular peripheral portion adapted to be supported approximately flush with a room wall,
   (b) a diffusion plate releasably supported within said peripheral portion and generally coplanar therewith,
   (c) a reduced area portion of said casing adapted to be conected to a duct of an air conditioning system,
   (d) a portion of said casing connecting said peripheral portion and reduced area portion so that all air entering said reduced area portion will pass through said diffusion plate,
   (e) an air damping unit supported in said reduced area portion, and
   (f) an air deflector unit supported in said reduced area portion and having aligned curved vanes supported on mutually aligned pivots and positioned within said casing to permit air to pass over both sides of each of said vanes and with the unpivoted edges of the vanes when fully opened being very close to said diffusion plate to provide a space between said damper and vanes in the nature of a small plenum chamber,
   (g) said diffusion plate formed of relatively high vibration damping material.

4. In an air diffusing register for the purpose and of the character described, the combination of
   (a) a casing having a generally rectangular peripheral portion adapted to be supported approximately flush with a room wall,
   (b) a diffusion plate releasably supported within said peripheral portion and generally coplanar therewith,
   (c) a reduced area portion of said casing adapted to be connected to a duct of an air conditioning system,
   (d) a portion of said casing connecting said peripheral portion and reduced area portion so that all air entering said reduced area portion will pass through said diffusion plate,
   (e) an opposed blade damper subassembly supported in said reduced area portion, and
   (f) an air deflector unit supported in said reduced area portion but spaced from said opposed blade damper unit to form a relatively small plenum chamber,
   (g) said air deflector unit including a plurality of mutually aligned pivoted louvers positioned within said casing to permit air to pass over both sides of each of said louvers and with unpivoted edges lying in close proximity to the said diffusion plate,
   (h) said damper assembly and air deflector unit being spaced to provide a relatively small plenum chamber between them.

References Cited

UNITED STATES PATENTS

| | | | |
|---|---|---|---|
| 1,559,376 | 10/1925 | Riker. | |
| 2,685,246 | 8/1954 | Saunders | 98—40 |
| 2,822,741 | 2/1958 | Kennedy | 98—40 |
| 2,901,961 | 9/1959 | Cotts. | |
| 2,976,795 | 3/1961 | Brugler | 98—40 |
| 3,166,001 | 1/1965 | Person et al. | 98—40 |
| 3,200,734 | 8/1965 | Burns et al. | 98—40 |
| 3,232,204 | 2/1966 | Gygax | 98—36 |
| 3,240,145 | 3/1966 | Lambert | 98—40 |

MEYER PERLIN, *Primary Examiner.*

ROBERT A. O'LEARY, *Examiner.*

W. E. WAYNER, *Assistant Examiner.*